Figure 1:
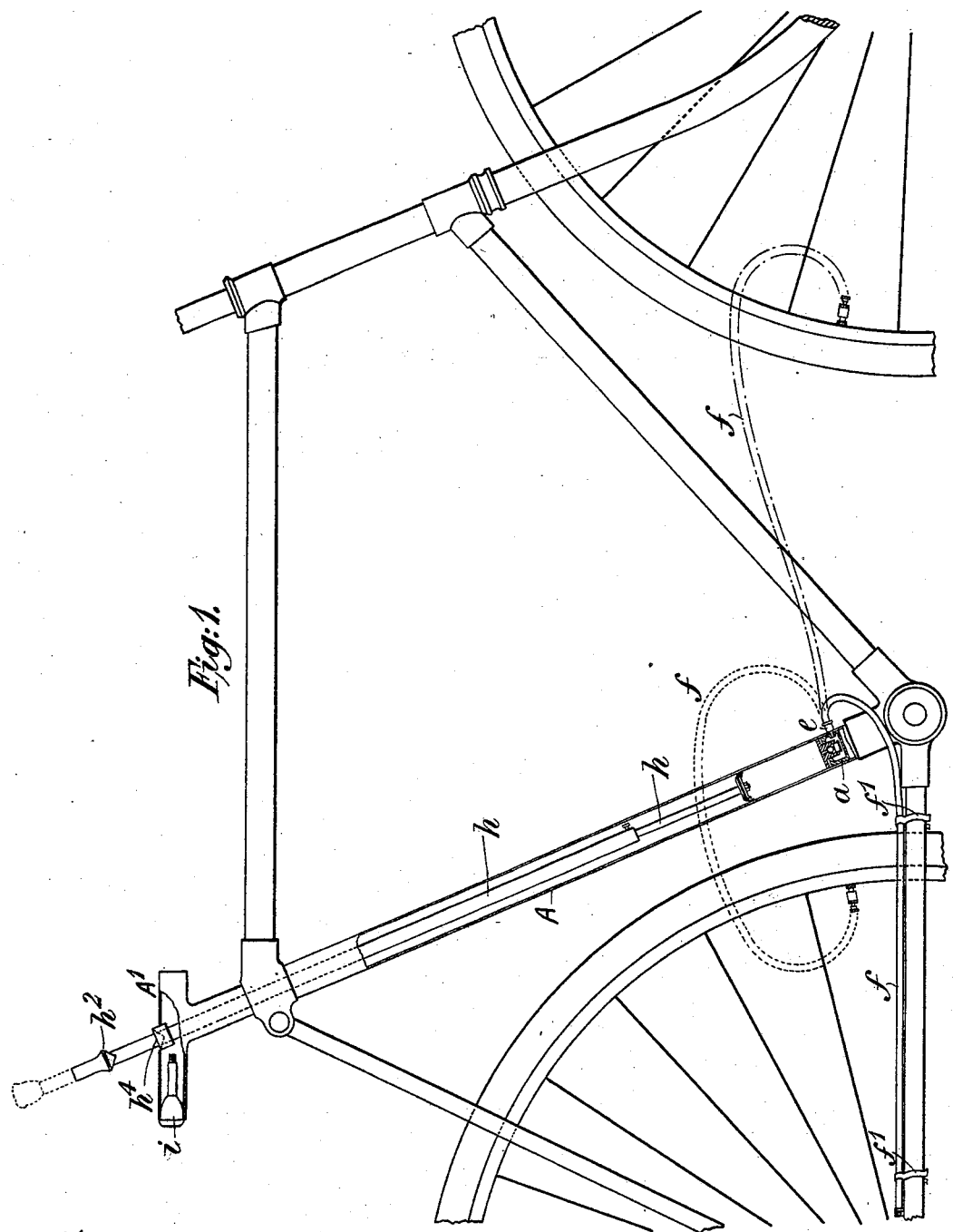

(No Model.) 2 Sheets—Sheet 1.

H. D. SIMPSON.
TIRE INFLATER IN CYCLE FRAMEWORK.

No. 588,840. Patented Aug. 24, 1897.

Witnesses:
Geo. W. Rea
Robert Emmett

Inventor:
Henry Dyson Simpson.
By James L. Norris.
Atty

THE NORRIS PETERS CO., PHOTO-LITHO., WASHINGTON, D. C.

(No Model.) 2 Sheets—Sheet 2.
H. D. SIMPSON.
TIRE INFLATER IN CYCLE FRAMEWORK.
No. 588,840. Patented Aug. 24, 1897.
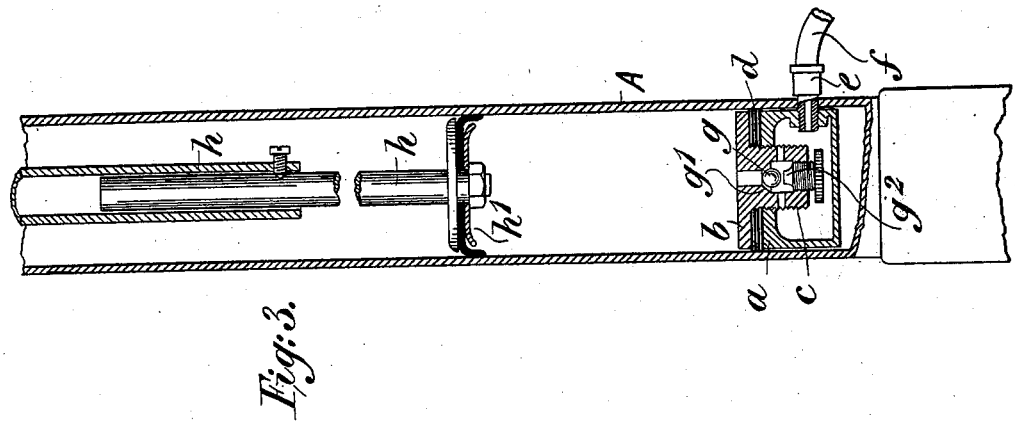
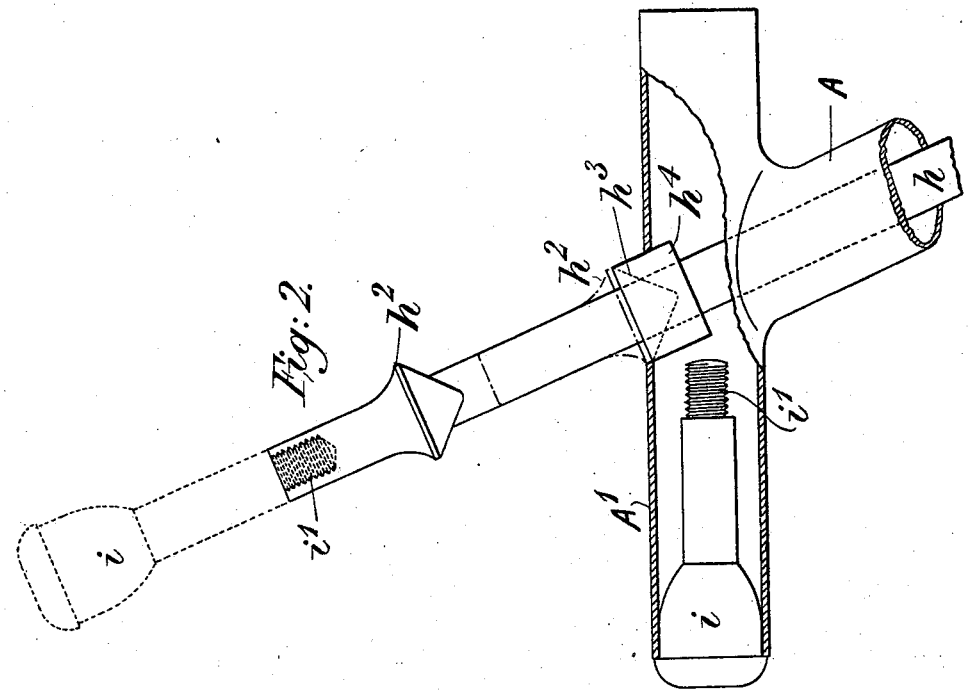
Witnesses.
Inventor.
Henry Dyson Simpson.
By James L. Norris.
Atty.

UNITED STATES PATENT OFFICE.

HENRY DYSON SIMPSON, OF DERBY, ENGLAND.

TIRE-INFLATER IN CYCLE-FRAMEWORK.

SPECIFICATION forming part of Letters Patent No. 588,840, dated August 24, 1897.

Application filed August 17, 1896. Serial No. 603,020. (No model.)

*To all whom it may concern:*

Be it known that I, HENRY DYSON SIMPSON, a subject of the Queen of Great Britain, residing at 2 Grove Bank, Duffield Road, in the town and county of Derby, England, have invented certain new and useful Improvements in Tire-Inflaters in Cycle-Framework, of which the following is a specification.

This invention relates to the inflation of pneumatic tires; and it consists of improved fittings for utilizing the tubular framework of the cycle as an inflater, to be hereinafter fully described, reference being had to the accompanying drawings.

Figure 1 shows a portion of a cycle with my present improvements applied. Figs. 2 and 3 show parts of the apparatus drawn to a larger scale than Fig. 1.

In carrying out my invention I employ a hollow metallic plug $a$, fixed in any straight tube of the framework, which plug is to be made in two parts $a$ and $b$, to be drawn together by means of a screw $c$, thereby forcing a ring $d$ of any compressible material—such as leather, rubber, and the like—against the walls of the tube, and I thus form an air-tight joint. I hold the plug in position by a hollow screw $e$, passing through the walls of the tube into the interior of the plug $a$, and utilize this screw as the nipple on which to fix a flexible tube $f$ to connect the pump with the tire.

The plug may contain a valve which may be of any suitable description, herein shown as a ball $g$ with valve-seat $g'$ and adjustable stop $g^2$. (See Fig. 3.)

I insert a piston-rod $h$ in the tube fitted with any form of plunger $h'$ capable of making an air-pump. If the piston-rod is used in the seat-tube A, as shown in Fig. 1, I make it capable of being adjusted to any required length either by making it telescopic (see Fig. 3) or in some other manner. At the end of the piston-rod opposite to that to which the plunger $h'$ is fixed I provide a collar $h^2$, which will rest on top of the seat-pillar A' and prevent the plunger at the bottom of the stroke striking against the plug. Said collar $h^2$ may be made to fit into a V or slot $h^3$ to steady the rod when at rest. (See broken lines $h^2$, Fig. 2.) I may fit in the top of the seat-pillar A' a bush or bearing $h^4$ for the rod $h$ to work through, which, by means of a screw, will grip the rod.

The pump is worked by a detachable handle $i$, and I arrange that this handle may be carried in the cross-piece of the T-pillar A'. (See full lines, Fig. 2, the handle being shown in operative position by dotted lines in the same figure.)

When not in use, the flexible tube $f$ is carried on a tube of the framework of the cycle by means of clips $f'$. The tube $f$ is shown connected to the tire of the rear or driving wheel by dotted lines, Fig. 1, and to the front wheel by broken or chain lines.

By my invention I locate the valved plug entirely within a tube constituting part of the framework. It will be seen that by reason of this arrangement my invention can be applied to bicycles or other like vehicles of ordinary construction very readily.

In prior constructions where it has been attempted to inflate the tires through the framework the valve has been arranged in a special construction of nipple fitted to the outside of the tube of the framework. These prior constructions are not adapted to be applied readily to machines of ordinary existing construction. My invention results in a distinct advantage as compared with such prior constructions in that it can be readily applied to ordinary bicycle-frames.

Having now particularly described and ascertained the nature of my said invention and in what manner the same is to be performed, I declare that what I claim is—

1. In a bicycle, the combination with a tubular part of the frame, of a two-part plug fastened therein and provided with compressible packing arranged between the two parts of the plug, means for drawing said parts together to compress the packing against the interior of the tubular frame to form an air-tight joint, a valve arranged in said plug, a threaded nipple for locking the plug in the frame and adapted for connection to an inflating-tube, and a plunger arranged in the tubular frame, substantially as described and for the purpose specified.

2. In a bicycle, the combination with a tubular part of the frame, of a hollow plug arranged therein, a valve arranged in said plug and controlling the communication between the interior of the plug and the tubular frame, a threaded nipple for locking the plug in the frame and communicating at its inner end with the interior of the plug and adapted to be connected at its outer end to an inflating-tube, and a plunger arranged in the tubular frame, substantially as described.

3. In a bicycle, the combination with a tubular part of the frame, of a two-part plug arranged therein and consisting of a part $b$ having a threaded hollow boss $c$ and a hollow part $a$ screwed over said boss, compressible packing-disks arranged between the parts $a$ and $b$, a valve $g$ arranged in said hollow boss, a nipple $e$ passing through the tubular frame and communicating at its inner end with the interior of the hollow plug and adapted for connection at its opposite end to an inflating-tube, and a plunger arranged in the tubular frame, substantially as described.

4. In a bicycle, the combination with a tubular part of the frame, of a two-part plug arranged therein and consisting of a part $b$ having a threaded hollow boss $c$ and a hollow part $a$ screwed over said boss, compressible packing-disks arranged between the parts $a$ and $b$, a valve $g$ arranged in said hollow boss, an adjustable stop $g^2$ fitted in the end of the hollow boss, means for connecting an inflating-tube to the hollow plug, and a plunger arranged in the tubular frame, substantially as described.

In testimony whereof I have hereunto set my hand in presence of two subscribing witnesses.

HENRY DYSON SIMPSON.

Witnesses:
WM. ALLAN REID,
THOS. HEATH.